United States Patent [19]

Chen

[11] Patent Number: 4,475,167

[45] Date of Patent: Oct. 2, 1984

[54] FAST COEFFICIENT CALCULATOR FOR SPEECH

[75] Inventor: Carson Chen, San Bruno, Calif.

[73] Assignee: National Semiconductor Corporation, Santa Clara, Calif.

[21] Appl. No.: 426,564

[22] Filed: Sep. 29, 1982

[51] Int. Cl.³ ............................................. G06F 7/52
[52] U.S. Cl. ................................................. 364/757
[58] Field of Search ................... 364/757, 764, 715

[56] References Cited

U.S. PATENT DOCUMENTS

| | | | |
|---|---|---|---|
| 3,571,580 | 3/1971 | Buchan et al. | 364/715 |
| 3,959,639 | 5/1976 | Köethmann | 364/760 |
| 4,118,785 | 10/1978 | Izumi et al. | 364/757 |
| 4,396,994 | 8/1983 | Kang et al. | 364/715 |

OTHER PUBLICATIONS

Waser et al., "Medium-Speed Multipliers Trim Cost, Shrink Bandwidth in Speech Transmission" *Electronic Design* vol. 27, Feb. 1, 1979, pp. 58–65.
Tylaska et al., "Digital Decibel Multiplier System" *Navy Technical Disclosure Bulletin* vol. 6, No. 6, Apr. 1981, pp. 19–25.

*Primary Examiner*—David H. Malzahn
*Attorney, Agent, or Firm*—Paul J. Winters; Gail W. Woodward; Michael J. Pollock

[57] ABSTRACT

A digital circuit to approximate the product of two numbers by shifting the bits in one number to higher significance positions by an amount equal to the bit position of the most significant "one" in the other number, useful in digital speech recognition and synthesis.

6 Claims, 5 Drawing Figures

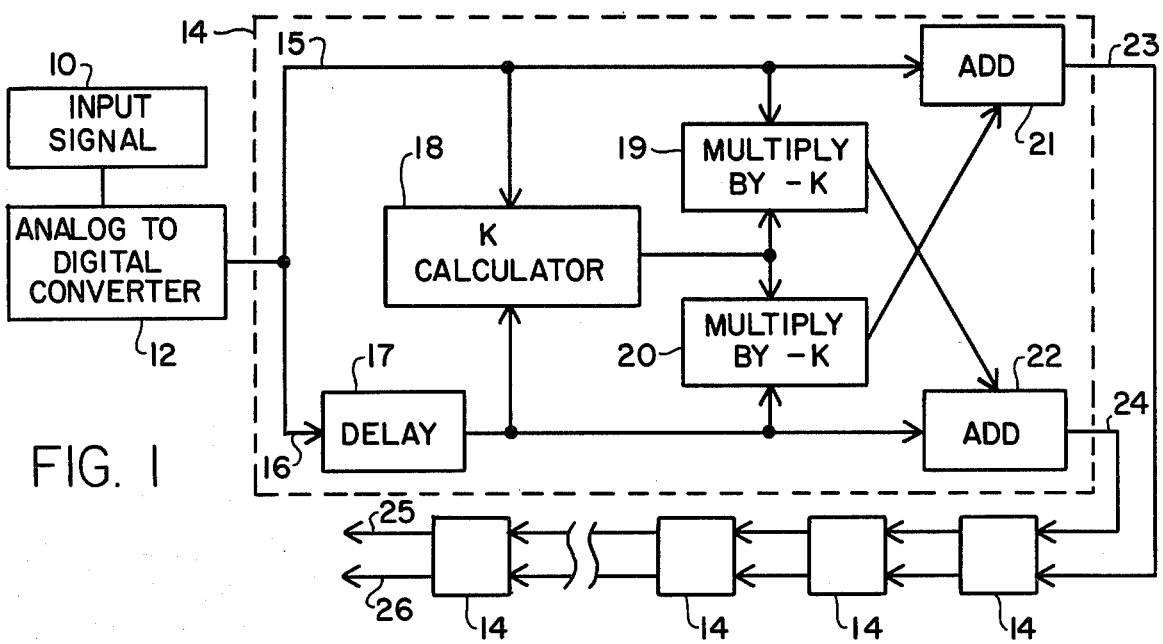
FIG. 1
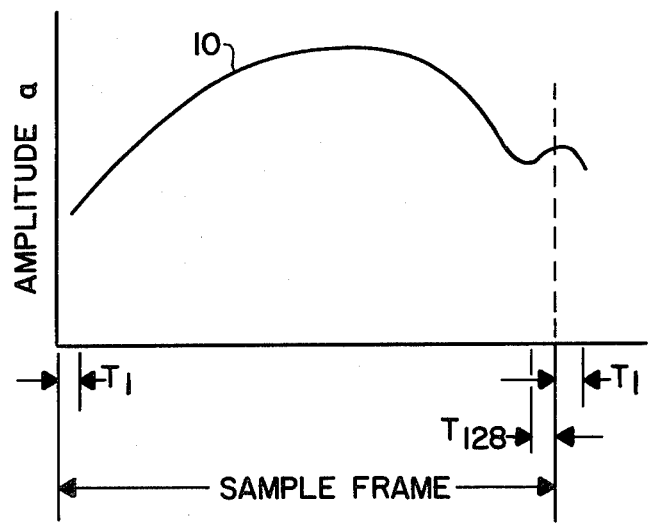
FIG. 2
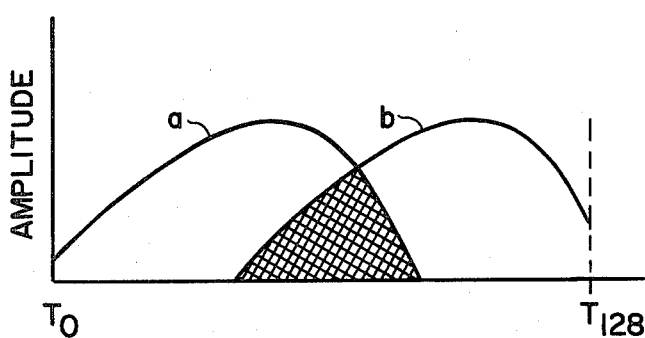
FIG. 3
| | $T_1$ | $T_2$ | $T_3$ | $\cdots$ | $T_N$ |
|---|---|---|---|---|---|
| $K_1$ | .7 | .2 | .6 | $\cdots$ | .8 |
| $K_2$ | .3 | .4 | .9 | $\cdots$ | .7 |
| $K_3$ | .5 | .5 | .3 | $\cdots$ | .6 |
| $\vdots$ | $\vdots$ | $\vdots$ | $\vdots$ | | $\vdots$ |
| $K_N$ | .4 | .9 | .1 | $\cdots$ | .8 |
FIG. 4

FAST COEFFICIENT CALCULATOR FOR SPEECH

BACKGROUND OF THE INVENTION

In order to create speech, recognize speech, or encode and decode speech for transmission it is desirable to be able to convert the complex waveforms of human speech into digital representations thereof, and back again, as efficiently as possible so that the digital portions of the system need handle only the lowest possible data rates. Cost and technical limitations always demand that the digital data represent just the essential information. For example, data needs to be stored in memory if speech is to be generated and the size of memory should be minimized. Another example is in speech recognition systems where data needs to be analyzed, preferably in real time, as fast as the speech is produced by a human, and there is always a practical limitation on the processing power that can be devoted to this task. Digital transmission, of course, requires both digital encoding, which is a kind of recognition, and decoding at the other end, a kind of generation.

Since human speech is full of redundant information, the prior art has developed a number of ways to extract only the minimum essential content of the speech for conversion to digital form. The reader is directed to page 28 of the October 1973 issue of the *IEEE Spectrum* for an article summarizing a variety of these techniques. One technique for coding only the essential information involves calculating a linear predictive coefficient and encoding that coefficient (K) digitally rather than trying to encode the actual analog waveform that makes up the speech. In this way, only the perceptually significant properties of the waveform are preserved.

Human speech basically consists of voiced and unvoiced components. Voiced sounds are produced by the vibrations of the vocal chords and comprise reasonably smooth and harmonic waveforms of a variety of frequencies. Subgroups of these frequencies are emphasized by the resonant characteristics of the vocal tract which concentrate the power or energy into certain areas of the frequency spectrum. Unvoiced speech, on the contrary, is fairly noisy being produced by air turbulence through narrow constrictions of the lips or tongue. Although resonance conditions concentrate unvoiced speech in a particular frequency area, it tends, at least in that frequency area, to have its power or energy distributed evenly across the frequency area. To digitally represent speech, it is necessary only to identify if the waveform is voiced or unvoiced, that is, if the waveform is smooth and harmonic, or noisy and random, and to identify the subgroups of frequency (called formants) in the voiced portion by their power content. This can be done by converting the analog speech waveform, with a standard, commercially available, analog to digital converter, into a series of digital numbers representing the magnitude, at any given instant, of the waveform. These numbers are then continuously analyzed to see how predictably and smoothly they change, during a selected time frame, as an indication of which formants are prevalent and whether the signal is voiced or not. This procedure is called autocorrelation, and it is conducted in a time domain as contrasted with a frequency domain.

The actual analysis involves calculating certain ratios of the numbers, at great speed, as the numbers are received, for each band of frequencies of interest. As such, the calculation is extremely multiplication intensive and requires very large, very fast computers if one is to keep up with the speech in real time. With the present state of the art, it is not practical to convert from analog to digital form on a real time basis. My invention solves this computational bottleneck as described hereinafter.

SUMMARY OF THE INVENTION

Briefly, the present invention provides a method and apparatus to speed up the calculation of the linear predictive coefficients K sufficiently such that reasonably priced microprocessors can digitally analyze human speech in real time. Hence, real time speech recognition is possible. The principles herein are referenced to the most important use of speech recognition but, of course, apply equally well to the generation of speech.

Basically, the speed up is achieved by multiplying in a short cut fashion. Instead of using very long detailed multiplication procedures on two binary numbers, the instant invention finds the most significant bit position, in at least one of the numbers, that has a 1 in it, and then simply shifts the other number to the left the same number of places as corresponds to that bit position. This produces a product much more quickly than conventional multiplication and since a large number of multiplications are needed to derive the K's, an enormous amount of time is saved. Unfortunately, the product one obtains is not exact, and sometimes can be quite inexact. But the nature of the formula for deriving K is such that these inexactitudes tend to cancel each other out and, thus, the eventual value of K is still quite usable. In fact, this fast multiplication technique has use in many digital signal processing applications in which ratios are calculated such as deriving power ratios, geometric means, autocorrelation, cross correlation, maximum entropy, harmonic mean, and other functions.

BRIEF DESCRIPTION OF THE DRAWINGS

FIGS. 1-4 assist an understanding of the prior art autocorrelation calculation that the present invention accelerates.

DESCRIPTION OF THE PREFERRED EMBODIMENT

Figure 5:
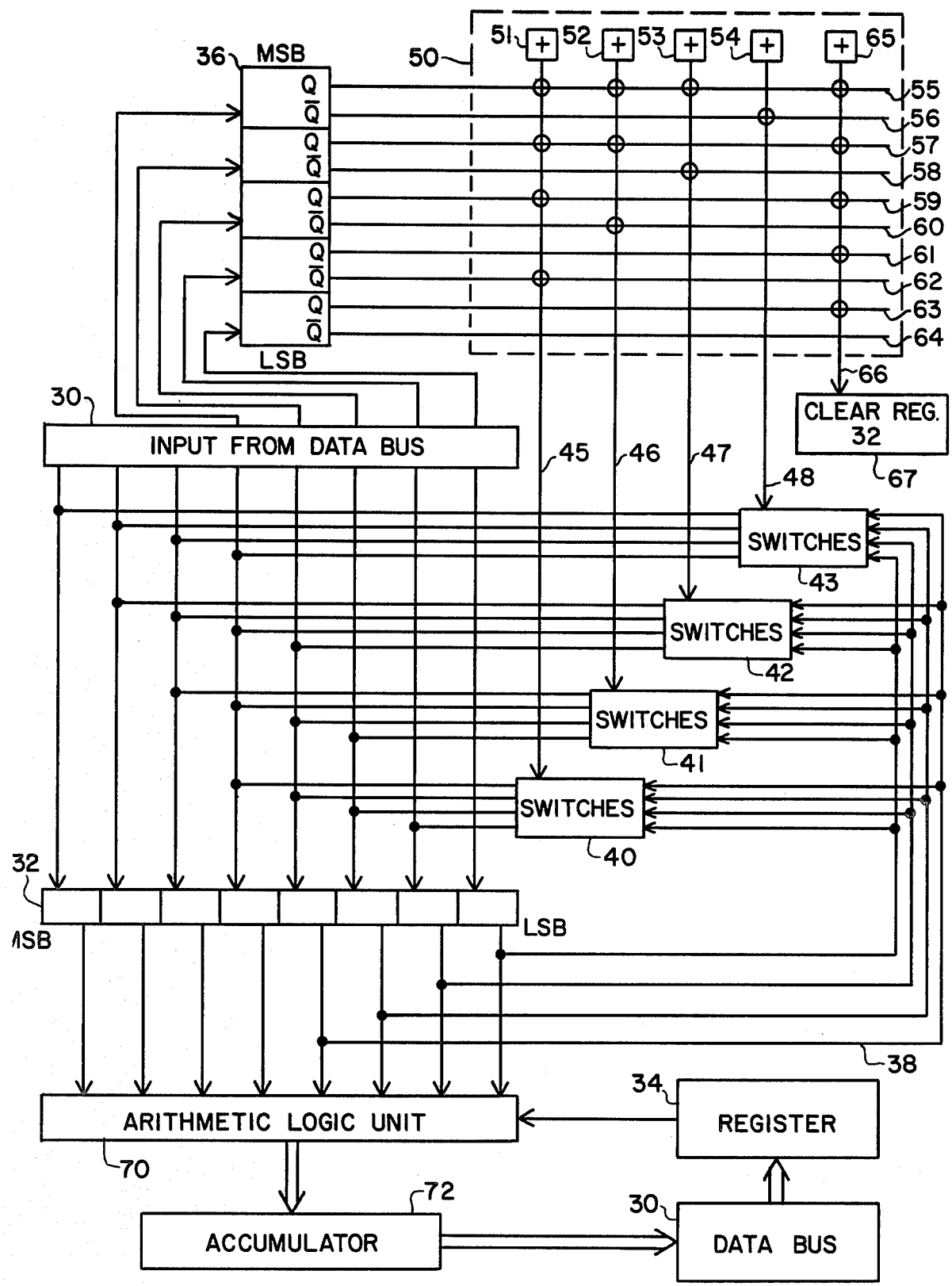
FIG. 5 schematically shows the circuit of the present invention that quickly approximates the product of two binary numbers.

Consider FIG. 1 and FIG. 2 simultaneously. FIG. 2 shows an analog input signal 10 that is also symbolically represented in FIG. 1. The amplitude of signal 10 varies in time, the segment in FIG. 2 representing an interval of time a little over 128 sampling periods in length. The 128 sampling periods collectively form one sample frame of perhaps 20 milliseconds in length. During each sampling period t, an analog to digital converter 12, measures the amplitude and generates a binary number representing that amplitude so that the signal can be analyzed digitally.

CORRELATION THEORY

A very useful digital analysis technique is to calculate the correlation coefficient. One way to define correlation between any two signals is to compare the power contained in one signal with the power contained in another and express this comparison as a ratio. Clearly, two analog signals that both had the waveshape shown in FIG. 2, and also the same amplitudes would contain equal power. Dividing the power of one by the power of the other would give a ratio of one, or a coefficient of one, indicating perfect correlation. Of course, two signals could have radically different waveshapes and still just happen to have the same power, but the probability of this happening is low, especially if a large number of comparisons are made at different times. Hence, power comparison is a valid tool to use in deciding if one analog signal is similar to another.

The power in an analog signal is proportional to the square of the area under the curve when that waveform is graphically illustrated in appropriate units, as in FIG. 2. Classically, one would determine this area under the curve 10 by multiplying the amplitude or height "a" of the curve 10, at each location on the horizontal time axis, by the width of the chosen increment in time and summing up all of these bits of area into the total area. If the chosen increment in time is caused to be infinitesimally small, the calculation of the area is exact. However, even if the time increment is as large as t in FIG. 2, one can still calculate a good approximation of the area and, thus, the power. Another way to simplify the mathematics is to arbitrarily use a unit of time measurement such that t is equal to 1. Then when you multiply "a" by t you get simply "a" and when you square that to get power you get $a^2$. Summing all 128 of the $a^2$ calculations in the sample frame of FIG. 2 provides the total power under curve 10. Expressed mathematically:

$$P = \sum_{n=1}^{128} a_n^2 \qquad (1)$$

To correlate two signals, and see if they are similar, one prior art approach is to examine the power of both signals simultaneously in one sample frame time period. FIG. 3 shows two signals having amplitudes a and b respectively. The two signals are similar in form but not correlated very well in time. Thier correlation, at least for the sample frame $t_0$ through $t_{128}$, may be defined by comparing the power under the two curves where they overlap (shaded area) to the total power of both curves. A number of mathematical expressions have been used in the prior art to make this comparison and generate a correlation coefficient K. Two such expressions are:

$$K = \frac{\sum_{n=1}^{128} a_n b_n}{\left[\sum_{n=1}^{128} a_n^2 \cdot \sum_{n=1}^{128} b_n^2\right]^{\frac{1}{2}}} \qquad (2)$$

$$K = \frac{2 \sum_{n=1}^{128} a_n b_n}{\sum_{n=1}^{128} a_n^2 + \sum_{n=1}^{128} b_n^2} \qquad (3)$$

Note that the denominator is squared, so as to eliminate any possible negative signs in the denominator. Note also that both expressions require a large number of multiplications for each sample frame.

AUTOCORRELATION THEORY

Instead of calculating the correlation of one signal to another, one may calculate the correlation of a signal to a time shifted version of itself. This is called autocorrelation. Signals that are well behaved, smooth, periodic, predictable, and harmonic have high autocorrelation coefficients, approaching 1. Noisy, unpredictable signals that bounce around a lot have low autocorrelation coefficients, approaching 0. The coefficient is still calculated with equation (2) or (3), but curve b is simply curve a, delayed somewhat in time, and might look like FIG. 3 if the delay was excessive. The prior art varies the delay over a wide range looking for significant correlations.

SPEECH RECOGNITION

Words and sounds, as spoken by humans, have characteristic, time varying, autocorrelation coefficients. That is to say, for each selected band of frequencies in the spoken word, the coefficient K will vary, in the range of zero to plus or minus one, during the length of time in which the word is spoken. FIG. 4 shows a table having a series of autocorrelation coefficients $K_1$ through $K_N$, each corresponding to a certain frequency band, and how they change at subsequent times $T_1$ through $T_N$ as the unique sound represented by them is spoken. The table of FIG. 4 may be stored in a computer memory and compared to coefficients calculated by the computer from a spoken word. If the calculated coefficients are within say 10% of the values in the table, the computer may declare a match and thus recognize the speech.

COEFFICIENT CALCULATION

FIG. 1 shows the basic unit, inside dashed line 14, needed to calculate one of the coefficients K for one band of frequencies. The amplitude of the input signal is measured at each interval t and represented as a binary word from converter 12. The binary word comprises simply a number, proportional to the amplitude, which is presented to two nodes 15 and 16. The number at node 15 is used by a K calculator 18 as quantity "a" in equation (3). For ease of description, a typical calculation according to equation (3) is described herein. The number at node 16 is delayed for a time period t, equal to the sampling period, by delay 17, and then sent to calculator 18 to be used as the "b" value in equation (3). Calculator 18, which comprises, in part, a conventional microprocessor, executes a program designed to solve equation (3). This requires calculator 18 to take each set of numbers from converter 12 and multiply "a" by "b," repeating the operation 128 times until the end of the sample frame, and then adding all 128 products so as to form the numerator in equation (3). The denominator is more complicated. 128 "a's" and "b's" must be squared, summed up, and then added together. This number is divided into twice the numerator. Since all of the a's and b's are not known until the end of a sample frame, the calculation of K cannot be completed until that time. But once K is calculated it is then stored in memory for comparison with a table of the kind shown in FIG. 4. So far only the first K of the first sample frame has been calculated.

In order to calculate K's for higher frequency bands, it is necessary to eliminate the dominant major amplitude changes in the signal that mask and obscure the higher frequency components. For example, in FIG. 2, curve 10 includes a significant small wiggle near time $t_{128}$ that, although important informationally, had little effect on the calculation of K, since K, resulted from a large scale average of the K's across the sample frame. The majority of curve 10, the basic frequency if you will, is removed by unit 14 by taking the first K, which was calculated during the sample frame, giving it a negative sign, and multiplying K times the node 15 and 16 numbers with multipliers 19 and 20. The node 15 and 16 numbers are stored in memory during the sample frame so as to await completion of the K calculation. At the end of the sample frame, when K has been determined, the sequence of numbers is retrieved from memory in order to multiply them by K with multipliers 19 and 20. Since K is an approximation of how much curve 10 changes from sample period to sample period, on the average, the multiplication by −K of the time shifted, slightly changed number, produces a negative number close to the original upshifted number. When they are added together by adders 21 and 22, most of the amplitude of the signal is cancelled leaving behind, at outputs 23 and 24, digital numbers representing only those portions of curve 10 that are unaverage and depart from the average overall characteristic changes shown by curve 10. In other words, outputs 23 and 24 carry higher frequency components of the waveform, such as the wiggle at the end of the sample frame in FIG. 2.

Outputs 23 and 24 are now directed to another unit 14 to calculate K for this higher frequency band. The process is repeated through as many units 14 as desired, depending on the complexity of analysis desired. As many as twenty units 14 have been tried by prior art practioners. The final outputs 25 and 26 may be stored in memory directly, to preserve all residual information.

In actual practice, of course, all the multiplications, additions, and K calculations, of all the units 14, would be done by the same microprocessor. All of these calculations take a lot of time especially when one considers how long it takes to make simply one multiplication of two sixteen-bit digital numbers. Furthermore, in order to work in real time, one can see that the multiplications by K and the additions by adders 21 and 22, for all of the units 14, need to be performed during a very short interval after the end of each sample frame and before new calculations are begun on new data. As a result, it is simply not practical in the prior art to perform speech recognition in real time, as each sound is received. To do so would require unacceptably expensive and large computers. Instead, present recognition systems, based on reasonably priced microprocessors, take a long time to analyze each word and thus impede normally paced conversations. The instant invention, solves this problem with a method and machine that can calculate K fast enough to make real time speech recognition possible.

FAST MULTIPLICATION

My invention speeds up the calculation of K by doing each of the multiplication steps with the high speed, short cut, circuit shown in FIG. 5. To multiply two numbers, the numbers are transferred from a data bus 30 into two registers or latches. One number is transferred into a shifter latch 32 with the most significant bit (MSB) on the left in FIG. 5. The other number is transferred into an examination latch 36. The number in latch 36 is examined to determine the most significant bit position that has a one in it. The number in shifter latch 32 is then shifted the same number of positions to, in effect, multiply it in one step by the power of two represented by the most significant digit present in the number in latch 36. To say it another way, latch 36 may be thought of as having bit positions zero through five, counting from the bottom up. If the most significant position having a one were position zero at the bottom, no shift would be performed since you would be multiplying by one. If the most significant position having a one turned out to be position two (third up from the bottom), you would shift the number in latch 32 two places to effect a multiply by four. Stated generally, one shifts the number in latch 32 by the same number as the number of the position in which the most significant one is found. If, for example, the number in examination latch 36 were 00101, representing five in the decimal system, an examination of the number would show that the most significant bit position that has a one in it was position two. Hence, the number in latch 32 is shifted two positions higher to, in effect, instantly multiply it by four. The result is, of course, not exact since the correct multiplier was five. But the approximation has been found to yield good results in caclulating rations where the same approximations are made in both the numerator and denominator of the ratio.

The number in latch 36 could be examined in a variety of ways including a software approach that simply starts at the most significant bit, tests to see if it is one, and if not, tests the next bit, and so on, all the while counting backwards until a one is detected. At that time, the program would shift the number in latch 32 as many places as the count. However, for the ultimate in speed, FIG. 5 discloses a hardware approach that operates in a single machine cycle.

For simplicity in the drawing, only a four position shift version is described. The least significant four bits are directed over a bus 38 to four sets of switches 40, 41, 42 and 43. Switches 40, are enabled by a signal on line 45 and, when so enabled, move the signals from bus 38 back into latch 32 in a position shifted one bit higher. This amounts to a multiplication by two. Similarly switches 41, enabled by line 46, move the bits two positions to multiply by four. The remaining two sets of switches 42 and 43 move the bits three and four positions respectively, in response to signals on lines 47 and 48, so as to multiply by eight and sixteen.

Selection of a set of switches, and thereby the number of shifts, is done by a decoder 50. Decoder 50 comprises a conventional ROM in which lines 45-48 are normally pulled positive by pull up transistors, or equivalent structures 51-54. The circles indicate those locations in the ROM matrix that have operating transistors. Latch 36 has two outputs for each bit position: a Q output that follows the input, and a "not" Q output that is the opposite. The most significant bit position in latch 36 has its Q output on a line 55 and its "not" Q output on a line 56. Thus, if there was a one present in the top position of latch 36, a voltage on line 55 would activate three transistors in the ROM to ground out and disable lines 45–47 which, in turn, would prevent the one, two, and three position shift switches 40–42 from operating. Only the four shift position switches 43 could operate. Such a shift of four positions would, in effect, multiply the number in latch 32 by sixteen.

If the top position in latch 36 is zero, a voltage on line 56 activates a transistor in the ROM to ground out and disable line 48. Switches 43 are then disabled and only the switches 40–42 may operate depending on the contents of the less significant bit positions in latch 36.

If the next to the top position in latch 36 has a one in it, lines 45 and 46 are grounded by line 57 so that only switches 42 may operate and shift the number in latch 32 three places so as to multiply by eight. It is not necessary to disable line 48, that having been done by the zero in the top position that causes a one on line 56. A zero in the next to the top position generates an output on line 58 that turns off line 47 and switches 42.

Similarly, the third from the top position in latch 36 disables, with line 59, the lower number position shift switches if it has a one, and its own position switches 41, with line 60, if it has a zero.

The fourth position from the top does not need to disable lines 46-48 because that has been accomplished by the zeroes in the more significant bit positions. And if there were zeroes in the more significant positions, line 45 remains high, enabling switches 40 and effecting a multiply by two. However, if there is a zero in the fourth position, a voltage on line 62 operates a transistor to ground out line 45 and prevent multiplication by two. In general, it may be seen that each of the switches 40-43 will operate to cause a shift unless disabled from doing so by either a zero in its own corresponding position or a one in any of the more significant positions.

Finally, the least significant bit (LSB) position represents a multiply either by one, which is trivial and requires no action, or by zero which requires latch 32 to be cleared. Latch 32 is cleared by a clear circuit 67 if circuit 67 receives a signal on line 66. Line 66 is pulled up by a voltage source 65, and thus produces a signal, unless it is grounded out by any of the Q signals on lines 55, 57, 59, 61 or 63 which would signal the presence of a one in latch 36 and therefore a non-zero multiplier.

Now that the numbers in latches 32 and 36 have been approximately multiplied, they can be conventionally added to previous sums using a conventional register 34, an ordinary ALU 70, and an accumulator 72.

It should be understood that a number of variations are possible without departing from the spirit of the invention including fast division by shifting the other way, alternative decoder designs for decoder 50, and multiple iteration operations over several machine cycles to shift one number for several different powers of two discovered in latch 36 rather than just the most significant power of two. In this last case, of course, the individual shift produced products would have to be stored temporarily and then added together to get the final product.

I claim:

1. A digital data processing circuit for quickly approximating the product of a first binary number and a second binary number comprising:
   first register means to hold said first number;
   second register means to hold said second number;
   register examination means connected to said first register means and operable to determine the most significant bit position in said first register means that has a one it when said first number is held in said first register means;
   shifting means connected to said second register means and to said examination means, said shifting means operable to shift the contents of said second register means, toward more significant positions, by a number of positions corresponding to the most significant bit position determined by said examination means; and
   output means connected to said second register means operable to output the shifted second binary number as an approximate product.

2. The circuit of claim 1 in which said shifting means comprises a plurality of groups of switches, each group operable to shift the digits of the second binary number a predetermined number of positions in response to an enabling signal from said examination means.

3. The circuit of claim 1 in which said register examination means comprises a decoder operable to produce a plurality of enabling signals, each of said enabling signals being produced when one of the bit positions in said first register means holds the most significant bit in said first binary number.

4. The circuit of claim 3 in which said decoder comprises a ROM coded in a manner so as to produce said enabling signals.

5. The circuit of claim 4 in which said shifting means comprises a plurality of groups of switches, each group operable to shift the digits of the second binary number a predetermined number of positions in response to an enabling signal from said examination means.

6. The circuit of claim 5 including a clearing means operable to clear said second register means unless one of the bit positions in said first register has a one in it.

* * * * *